United States Patent
Mackenzie

Patent Number: 5,899,473
Date of Patent: May 4, 1999

[54] RETRACTIBLE MUDGUARD

[76] Inventor: John Mackenzie, 20 Canal Street, St. Catharines, Ontario, Canada, L2N 4S8

[21] Appl. No.: 08/688,941

[22] Filed: Aug. 1, 1996

[51] Int. Cl.[6] ................................................ B62D 25/16
[52] U.S. Cl. ................................. 280/152.3; 280/152.1; 280/852
[58] Field of Search ............................ 280/847, 852, 280/152.1, 152.2, 152.3, 160.1

[56] References Cited

U.S. PATENT DOCUMENTS

| | | | |
|---|---|---|---|
| 617,836 | 1/1899 | Peterson | 280/152.3 |
| 1,112,478 | 10/1914 | Roderick | 280/152.3 |
| 1,226,323 | 5/1917 | Fialkowski | 280/152.3 |
| 1,266,251 | 5/1918 | Green | 280/152.1 |
| 1,577,146 | 3/1926 | Pawsat | 280/152.1 |

FOREIGN PATENT DOCUMENTS

| | | | |
|---|---|---|---|
| 197154 | 4/1938 | Switzerland | 280/11.37 |
| 7532 | of 1895 | United Kingdom | 280/152.3 |

*Primary Examiner*—Robert J. Oberleitner
*Assistant Examiner*—Min Yu
*Attorney, Agent, or Firm*—Kenneth M. Garrett

[57] ABSTRACT

A mudguard comprises a first portion that is fixed relative to the frame of a bicycle and a second arcuate portion mounted to tracks associated with the first portion to be extended from or telescoped therein as desired. The distal end of the second portion is supported by struts which are rotatable about a rim forming a part of a mount secured to the wheel axis in concentric relation therewith. The arrangement permits a relatively rattle free attachment of the mudguard.

9 Claims, 3 Drawing Sheets

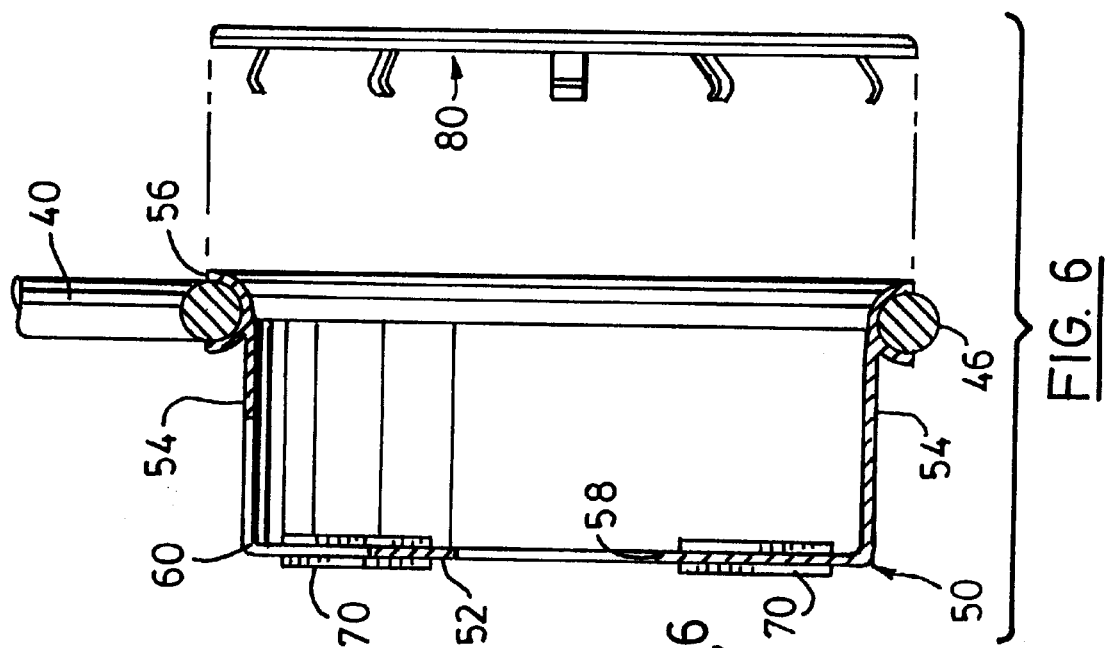
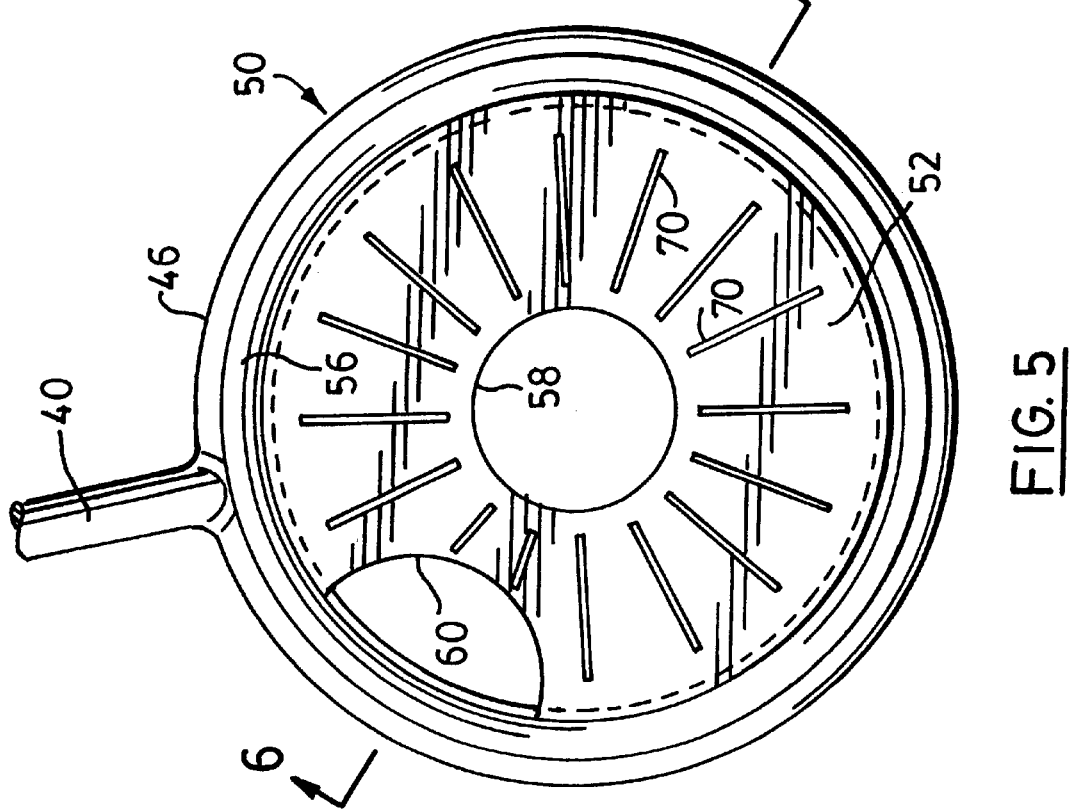

5,899,473

RETRACTIBLE MUDGUARD

FIELD OF INVENTION

This invention relates to bicycle mudguards. It particularly relates to retractable mudguards.

BACKGROUND OF THE INVENTION

In U.S. Pat. No. 617,836 (Peterson) there is described a mudguard that is secured adjacent one end only thereof to the frame of a bicycle to project above a portion of the wheel of the bicycle. The mudguard is made from at least two portions that are telescopically receivable within each other, so as to permit the mudguard to be retracted when not required, for example, in dry conditions.

In U.S. Pat. No. 1,226,323 (Fialowski) the distal end of a retractible mudguard is supported by a strut rotatably secured to a lug mounted to the frame of the bicycle. The axis of rotation of the strut is offset from the axis of rotation of the bicycle wheel, whereby the locus of the distal end of the mudguard as it moves between its stored and retractible positions is not concentric with the wheel. Accordingly, a relatively large clearance must be provided between the mudguard and the wheel so as to avoid contact between them.

Although it appears that no tool would have been necessary for adjusting the mudguards of the prior art between their extended and retracted positions, it is probable that the contemplated structures would have quickly developed annoying rattles in use.

Bicycle mudguards can become caked with dirt which will tend to make it difficult to retract the mudguards and to mar the surface finish thereof.

It is an object of this invention to provide retractible mudguards wherein mounting means is provided to permit the mudguard to move concentrically with the wheel.

It is another object of this invention to provide such mudguards which are adjustable without requiring the use of any tool, yet which may be structured to diminish the possibility of rattling.

It is still another object of this invention to provide adjustable mudguards having a self-cleaning capability.

SUMMARY OF THE INVENTION

In accordance with one aspect of this invention, a retractible mudguard includes a first portion which is intended to be secured to the frame of the bicycle in fixed relation therewith, and at least one arcuate portion which is mounted so as to be extensible from the first portion along a circular path concentered on the axle of a wheel of the bicycle. The means for mounting the arcuate portion comprises arcuate tracks associated with the first portion along which one end of the arcuate portion is retractibly slidable, and strut means from which the other end of the arcuate portion is supported. The strut means connects to a strut mounting means which comprises a flange portion for attachment of the strut mounting means to a bicycle frame in fixed relation at a wheel axle thereof, and a rim portion about which the strut means is movable in concentric relation to the wheel axle.

The rim portion provides a relatively large surface from which the strut means is supported to permit a relatively rattle-free connection that is movable without the use of any tool.

Suitably and preferably, the rim portion is supported from the flange portion in axially offset relationship thereto, so as to permit the strut end adjacent to its attachment to the rim portion to be rotated without interference from the frame of the bicycle and other attachments thereto. In accordance with the preferred embodiment, the strut mounting means is in the form of a hollow housing, and a detachable closure is provided for the housing.

Also preferably, the first portion of the mudguard is arcuately formed, and the track means comprises gutters formed at each transverse side along the length of the first portion. Suitably, the proximal end of the arcuate portion of the mudguard is provided with an end mounting member having an outwardly facing surface that is complementary to the inwardly facing surface of the first portion, so as to provide a scraping action which will act to clean the first mudguard portion each time the arcuate portion is moved to and from its retracted position. Desirably, the arcuate portion intermediate the end mounting member and the distal end is formed so as to be marginally spaced apart from the first portion so as not to create binding or marring of the arcuate portion as it is moved relative to the first portion.

The foregoing objects and aspects of the invention, together with other objects, aspects and advantages thereof will be more apparent from a consideration of the following description of the preferred embodiment thereof taken in conjunction with the drawings annexed hereto.

BRIEF DESCRIPTION OF THE DRAWINGS

FIG. 5—shows in side elevation on enlarged scale the adjustable strut support forming a part of the assembly of FIG. 1; with the cover removed; and FIG. 6—is a section on line 6—6 of FIG. 5, with the cover included.

DESCRIPTION OF THE PREFERRED EMBODIMENT

Figure 1:
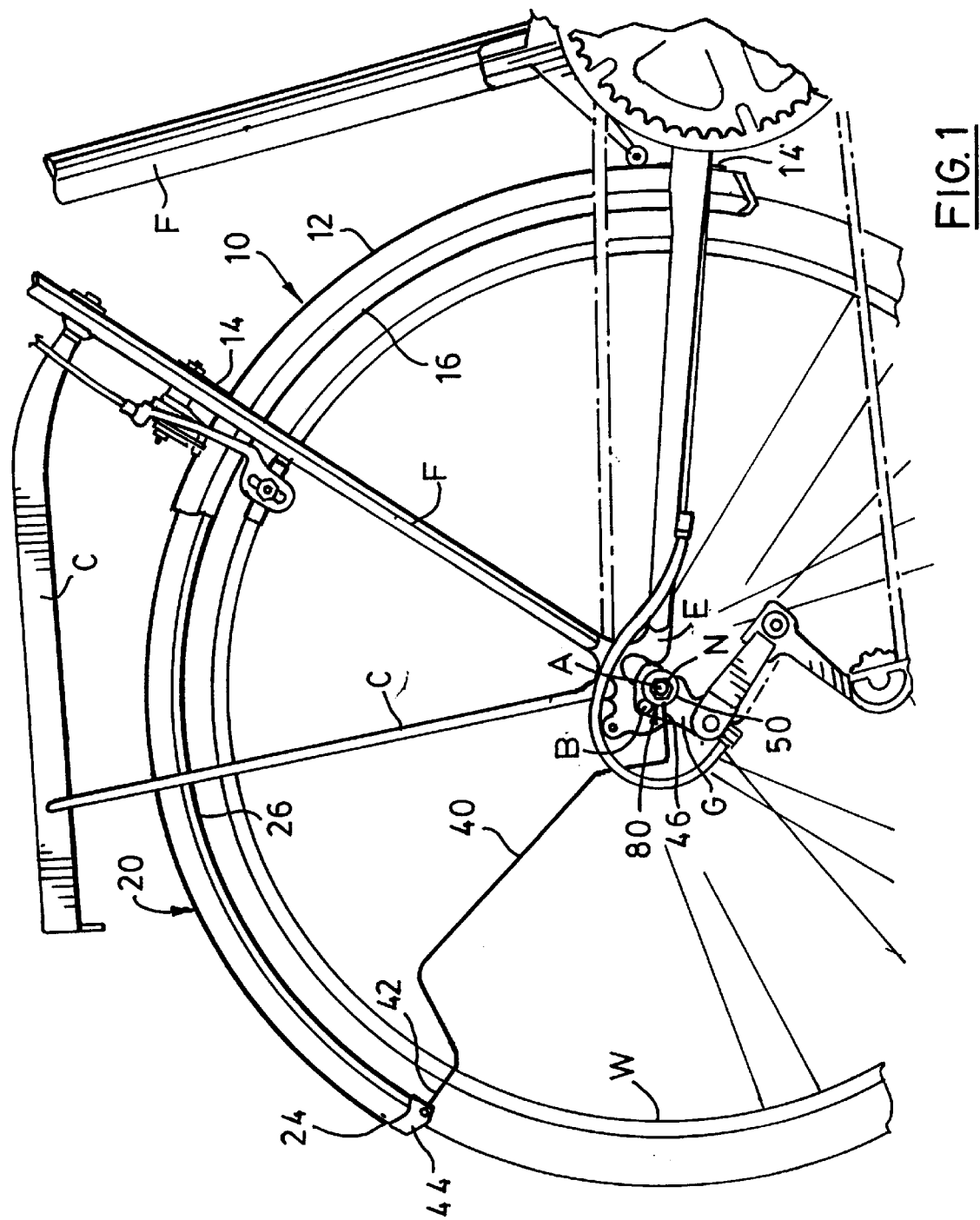
FIG. 1—shows in side elevation a portion of the rear of a bicycle with the mudguard of the invention attached thereto, shown in extended position.
Figure 2:
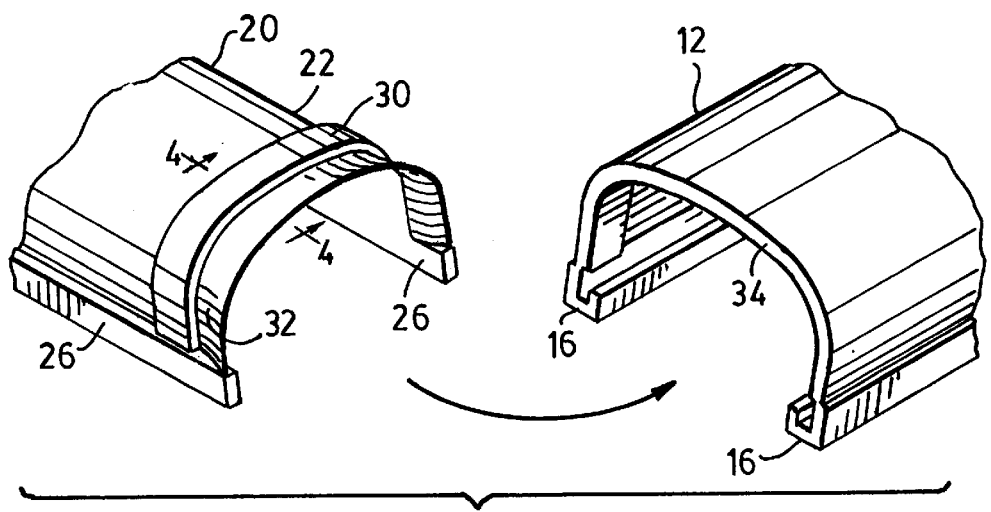
FIG. 2—shows in perspective exploded view two sidably engageable end portions of the mudguard of FIG. 1.
Figure 3:
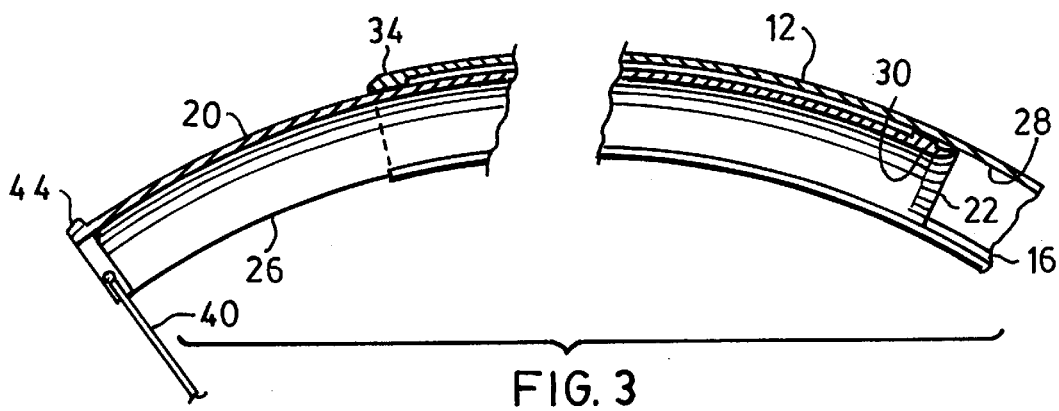
FIG. 3—shows in longitudinal cross section broken to indicate indefinite length the proximal and distal end portions of the arcuate portion of the mudguard in assembled relationship with the fixed portion.
Figure 4:
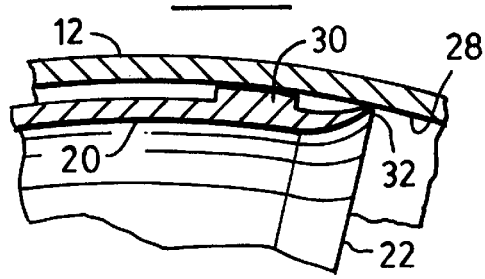
FIG. 4—is a fragmentary section on line 4—4 of FIG. 2 on enlarged scale, assuming the two portions to be in assembled relationship.

Referring to the drawings in detail, a bicycle typically comprises a frame F with fork ends E from which a wheel W is supported at axle A. The bicycle will also normally comprise a derailleur type gear mechanism G mounted at axle A, and may include a carrier C supported in part from the fork ends E.

A retractible mudguard in accordance with the invention is identified generally by the numeral 10. Mudguard 10 comprises a first portion 12 which is secured in fixed relationship to frame F conveniently by means of brackets 14. A pair of tracks 16 are supported from first portion 12 so as to extend in concentric relationship with wheel W. Preferably as is illustrated; where the first portion 12 extends over a substantial angular internal, it is arcuately formed as so to extend concentrically with wheel W, and tracks 16 are unitarily formed with the first portion so as to extend longitudinally along the transversely opposed sides thereof. Mudguard 10 further comprises a retractible portion 20 having a proximal end 22 and a distal end 24. Retractible portion 20 is arcuately formed and has longitudinal edges 26 which are respectively received in tracks 16 for movement therealong. In transverse cross section, retractible portion 20 has a somewhat lesser width and height than the first fixed portion 12 so as to be marginally spaced apart from the interior wall surface 28 thereof between the proximal and distal ends 22, 24. Adjacent to the proximal end 22 there is provided a mount in the form of a narrow band 30 having a cross section such that it will form a light rubbing contact with the inwardly facing wall surface 28 of first portion 12. In addition thereto, the proximal end is outwardly curved whereby the free edge 32 thereof will be lightly sprung against the inwardly facing wall surface 28 when the mudguard portions 12 and 20 are in their assembled relationship. The rearwardly facing end of first portion 12 is provided with a stop 34 which will abut band 30 when the retractible portion 20 is fully extended.

The distal end 24 of the retractible portion 20 is supported by a strut 40 on each lateral side thereof. Struts 40 are secured at one end 42 thereof in fixed relation to the distal end 24 by an end-fitting 44. The opposed end 46 of each strut 40 is supported from frame F by a strut mount 50. Strut mount 50 is in the form of a hollow, open ended housing comprising a flange 52 forming one end of the housing, and a surrounding sidewall 54, the free edge of which is outwardly cupped in cross-section to form a rim 56 therearound axially spaced apart from the plane of flange 52. Flange 52 has a central opening 58 therethrough and a lateral opening 60 which extends partially over sidewall 54. A plurality of radial ribs 70 are raised on flange 52. A cap 80 is detachably securable to cover the open end, of strut mount 50. The end 46 of each strut 40 is in the form of a hoop in which rim 56 is tightly received.

In using the mudguard 10 of the invention, the first portion 12 of the mudguard is secured to frame F with brackets 14 or as may be otherwise convenient. Strut mounts 50 are secured in fixed relation to the frame F at axles A which pass through central openings 58, by means of nuts N by which the wheel will normally be mounted. The strut mount 50 which locates on the lateral side of the bicycle on which the derailleur gear G is mounted will be dispersed axially outwardly of the gear, and opening 60 will form a clearance for a small bolt B normally associated with the gear mount. Following the tightening of wheel nuts N, caps 80 are secured in position to cover the nuts. Struts 40 as supplied will normally be cranked as at 82 intermediate the ends 46, 48 thereof to provide a suitable clearance between the struts and supports for carrier C.

It will be apparent that many changes may be made to the illustrative embodiment while falling within the scope of the invention, and it is intended that all such changes be covered by the claims appended hereto.

I claim:

1. A telescopically retractible mudguard for a bicycle having a frame and wheels respectively supported from said frame by axles, comprising:

a first mudguard portion, means for securing said first mudguard portion in fixed relation to said frame to extend above a portion of the perimeter of a wheel in spaced relationship therewith;

an arcuate mudguard portion having a proximal end and a distal end opposed thereto;

arcuately extending track means associated with said first portion;

means mounting said proximal end of said arcuate portion to said track means for movement therealong;

a strut having opposed ends;

strut mounting means comprising a flange portion to permit said strut mounting means to be secured in fixed relation to the frame of a bicycle at a wheel axle thereof, and a rim portion;

means mounting said strut at one end thereof to said rim portion of said strut mounting means for movement thereon concentric with a said wheel axle; and means securing the other end of said strut to the distal end of said arcuate mudguard portion in fixed relation therewith.

2. A mudguard as defined in claim 1 wherein said flange portion is generally planar and wherein said rim portion is supported from said flange portion in axially offset relationship therewith.

3. A mudguard as defined in claim 2 wherein said strut mounting member is in the form of a hollow, open ended housing.

4. A mudguard as defined in claim 2 wherein said flange portion is provided with a central opening therethrough for a wheel axle, and at least, one other opening offset from said central opening to provide a clearance for a bicycle gear mounting member.

5. A mudguard as defined in claim 2 wherein said flange is provided with a central opening therethrough for a wheel axle and a plurality of radial ridges thereon to facilitate the clamping of said flange to said frame.

6. A mudguard as defined in claim 3 comprising a detachable closure for said housing.

7. A mudguard as defined in claim 1 wherein said first portion is arcuately shaped and wherein said track means comprises gutters formed along the length of said first portion on transversely opposed sides thereof.

8. A mudguard as defined in claim 7 wherein said proximal end is provided with an end mounting member having an outwardly facing surface with a complementary form to the inwardly facing surface of said first portion to bear thereon, and wherein said second portion intermediate said opposed ends is generally spaced apart from said first portion when said second portion is telescopically received within said first portion.

9. A mudguard as defined in claim 8 wherein said proximal end is outwardly flared so as to bear on the inwardly facing surface of said first portion and provide a scraping action as said proximal end is moved relative to said first portion.

* * * * *